US006494005B2

(12) United States Patent
Zimmerman

(10) Patent No.: US 6,494,005 B2
(45) Date of Patent: Dec. 17, 2002

(54) TELESCOPIC LINEAR ACTUATOR

(75) Inventor: Dean A. Zimmerman, Comstock Park, MI (US)

(73) Assignee: Suspa Incorporated, Grand Rapids, MI (US)

( * ) Notice: Subject to any disclaimer, the term of this patent is extended or adjusted under 35 U.S.C. 154(b) by 0 days.

(21) Appl. No.: 09/901,225

(22) Filed: Jul. 9, 2001

(65) Prior Publication Data

US 2002/0116881 A1 Aug. 29, 2002

Related U.S. Application Data

(60) Provisional application No. 60/265,981, filed on Feb. 2, 2001.

(51) Int. Cl.[7] .................................................. F16H 1/10

(52) U.S. Cl. ............................ 52/296; 52/111; 52/632; 254/198; 254/420; 254/425; 74/493; 74/531; 74/89.15; 108/147; 108/147.19; 108/20; 108/21

(58) Field of Search ................................ 254/420, 425, 254/DIG. 2, 198; 52/111, 632; 108/147, 147.19, 20, 21

(56) References Cited

U.S. PATENT DOCUMENTS

| | | | | | |
|---|---|---|---|---|---|
| 3,592,443 | A | * | 7/1971 | Budrow et al. | 254/86 |
| 4,062,156 | A | * | 12/1977 | Roth | 52/111 |
| 4,067,543 | A | * | 1/1978 | Orth et al. | 254/86 |
| 4,137,784 | A | * | 2/1979 | Griffin | 74/89.15 |
| 4,337,868 | A | | 7/1982 | Gattu | |
| 4,444,540 | A | | 4/1984 | Blatt et al. | |
| 4,614,128 | A | | 9/1986 | Fickler | |
| 4,635,904 | A | * | 1/1987 | Whittingham | 254/425 |
| 4,651,581 | A | | 3/1987 | Svensson | |
| 4,793,197 | A | | 12/1988 | Petrovsky | |
| 4,817,977 | A | * | 4/1989 | Bookbinder | 280/304 |
| 4,867,000 | A | | 9/1989 | Lentz | |
| 5,128,688 | A | | 7/1992 | West | |
| 5,249,474 | A | | 10/1993 | Gregory | |
| 5,267,480 | A | * | 12/1993 | Krizan | 74/493 |
| 5,319,990 | A | | 6/1994 | Veale et al. | |
| 5,733,096 | A | | 3/1998 | Van Doren et al. | |
| 6,026,970 | A | | 2/2000 | Sturm, Jr. et al. | |

OTHER PUBLICATIONS

Appendix A—1 page of photographs of three–section telescopic leg with the motor in the middle tube.

* cited by examiner

*Primary Examiner*—Carl D. Friedman
*Assistant Examiner*—Basil Katcheves
(74) *Attorney, Agent, or Firm*—Price, Heneveld, Cooper, DeWitt & Litton

(57) ABSTRACT

An inner leg telescopically fits within an outer leg and includes a motor coaxially mounted to an end remote from the outer leg. A drive screw is coupled to the motor shaft and extends through a drive nut in an axially extending drive nut riser. As the motor rotates the drive screw, the inner leg extends and retracts from the outer leg. In a preferred embodiment of the invention, the drive nut riser is a hollow cylindrical tube extending substantially the length of the outer tube to position the drive nut near the intersection between the inner and outer legs when fully extended. Such an arrangement allows a motor to be coaxially mounted within the inner leg and, therefore, concealed and provides the desired extension and retraction of the legs for adjustment to different operative positions.

16 Claims, 2 Drawing Sheets

TELESCOPIC LINEAR ACTUATOR

CROSS-REFERENCE TO RELATED APPLICATIONS

This application claims priority under 35 U.S.C. § 119(e) on U.S. Provisional Application No. 60/265,981 entitled TELESCOPIC LINEAR ACTUATOR, filed on Feb. 2, 2001, by Dean A. Zimmerman, the entire disclosure of which is incorporated herein by reference.

BACKGROUND OF THE INVENTION

Linear actuators are employed in a variety of applications including, for example, adjustable legs for a work surface which can be moved between lowered and raised positions for use when an operator is sitting or in a standing position. Such actuators typically employ a motor mounted to the undersurface of the table and a right angle drive which extends within the telescopic table legs and couples to a drive screw for raising and lowering one of the telescopic legs with respect to the other leg utilizing a drive nut threadably coupled to the drive screw. Although such systems have found widespread use and operate to provide the desired range of motion, the utilization of a motor external to the telescopic leg is somewhat unsightly and, in many applications, esthetically unacceptable. It would be desirable, therefore, to provide a motor-driven telescopically adjustable table leg in which the drive motor can be concealed within the table leg itself.

SUMMARY OF THE INVENTION

The system of the present invention provides such an advantage by providing a drive system for an adjustable leg which includes an outer tubular leg with an inner tubular leg telescopically mounted therein. Extending from the base of the outer leg upwardly and in concentric relationship thereto is a drive nut riser tube having a drive nut mounted to an upper end thereof substantially near the upper end of the outer leg. An inner tubular leg telescopically fits within the outer leg and includes a motor mounted within the inner leg at an end remote from the outer leg. A drive screw is coupled to the motor shaft and extends through the drive nut in the drive nut riser. As the reversible motor rotates the drive screw, therefore, the inner leg extends from and retracts into the outer leg.

In a preferred embodiment of the invention, the drive nut riser is a hollow cylindrical tube extending substantially the length of the outer tube to position the drive nut near the intersection between the inner and outer legs when fully extended. Such an arrangement allows a motor to be coaxially mounted within the inner leg and, therefore, concealed to provide the desired extension and retraction of the leg for adjustment to different operative positions.

These and other features, objects and advantages of the present invention will become apparent upon reading the following description thereof together with reference to the accompanying drawings.

DETAILED DESCRIPTION OF THE PREFERRED EMBODIMENT

Figure 1:
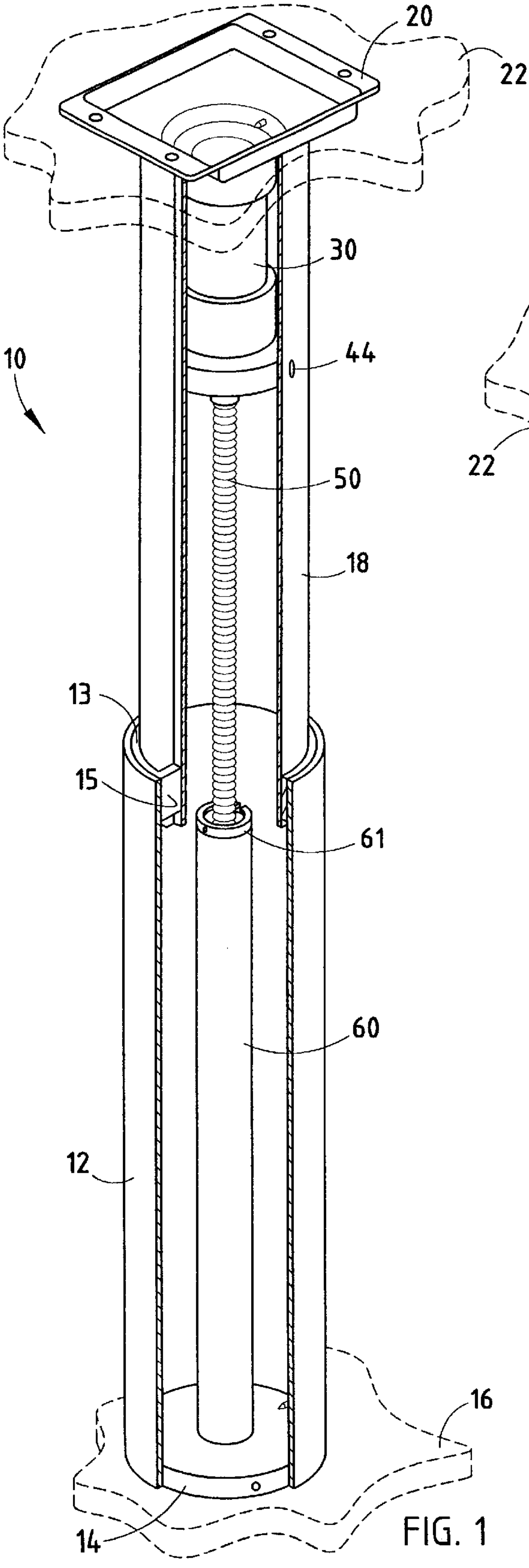
FIG. 1 is a perspective view, partly broken-away, of a telescopic leg assembly embodying the present invention, shown in an extended position.
Figure 2:
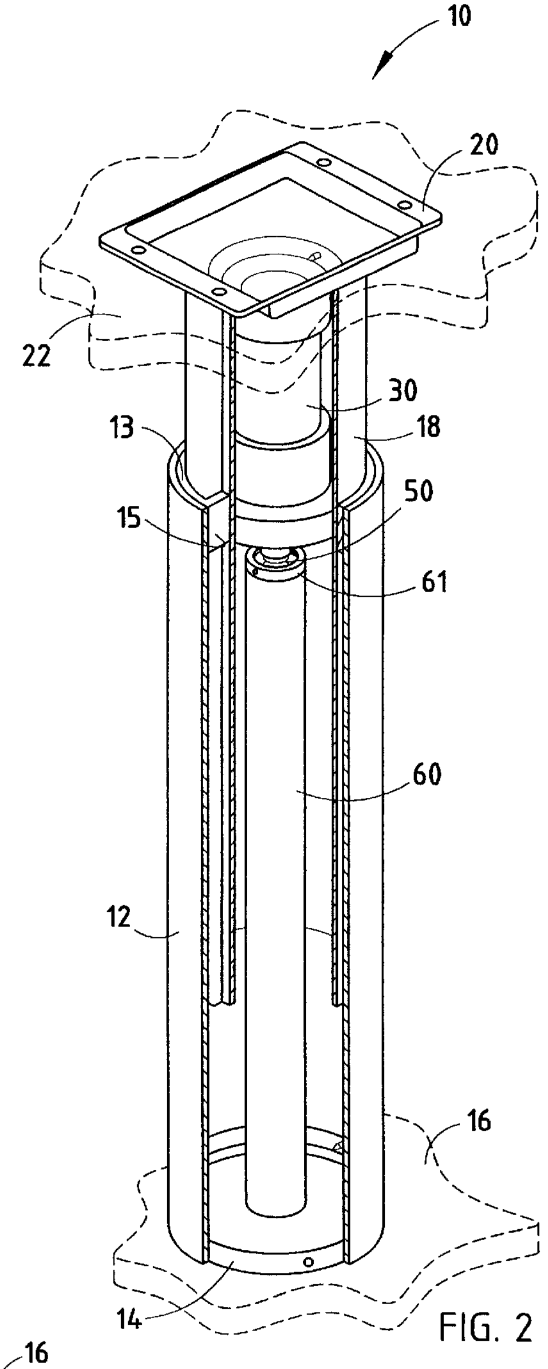
FIG. 2 is a perspective view, partly broken-away, of a leg assembly embodying the present invention, shown in a retracted position.

Referring initially to FIGS. 1 and 2, there is shown an adjustable motor-driven telescopic leg assembly 10 embodying the present invention. Assembly 10 includes an outer leg 12, which is in form of a tube and preferably a cylindrical tube, having a cylindrical base plate 14 mounted in the lower end thereof for supporting the leg assembly 10 on a support such as floor 16. Outer leg 12 telescopically receives an inner leg 18, which is also tube shaped to conform to leg 12 and, in the preferred embodiment, cylindrical having an outer diameter slightly smaller than the inner diameter of the outer leg 12 such that the legs can telescopically fit within one another as shown in FIGS. 1 and 2. Welded to the top of leg 18 is a mounting plate 20 for securing the assembly to the undersurface of a table 22, shown in fragmentary form in FIG. 1.

Figure 3:
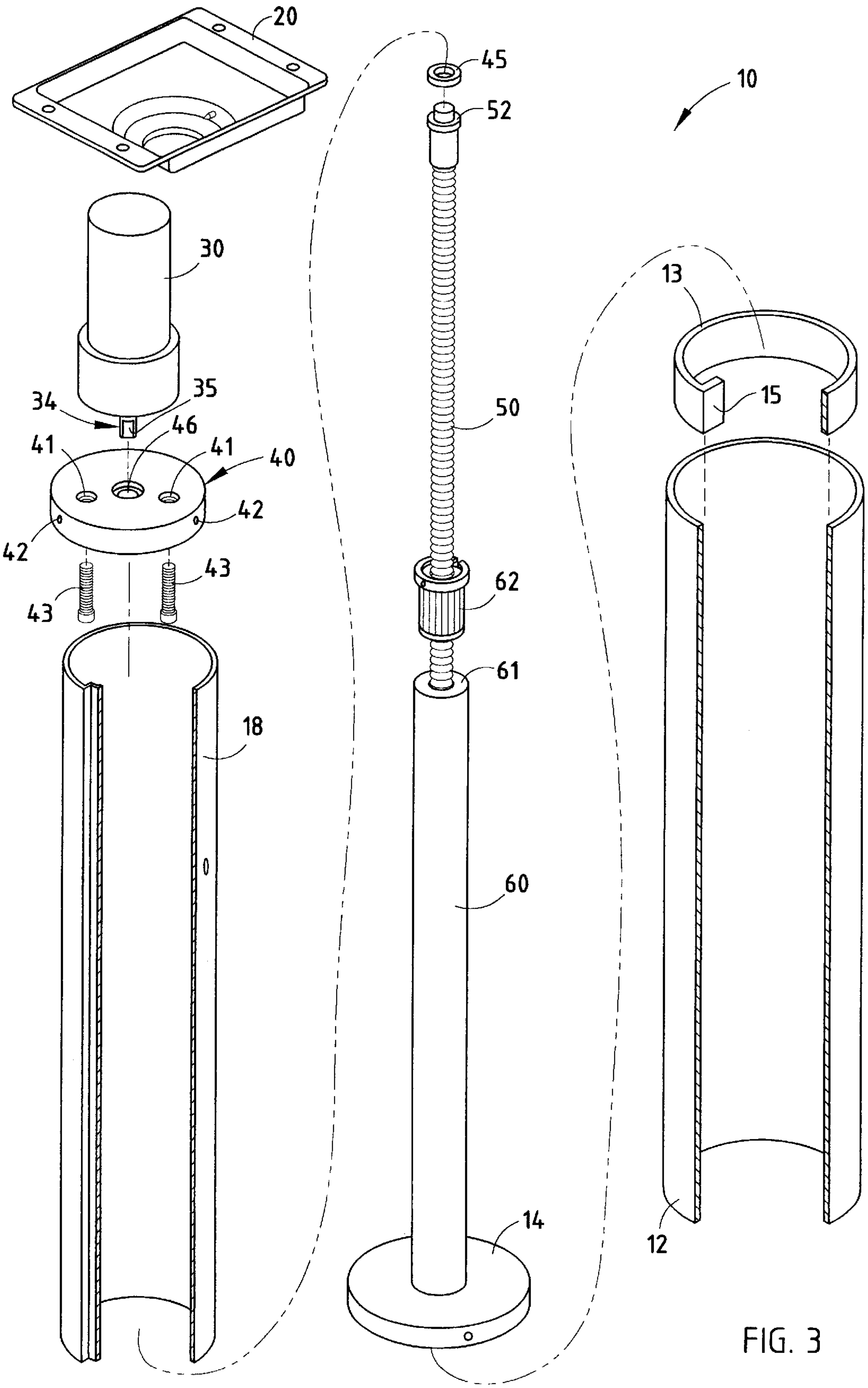
FIG. 3 is an exploded perspective view of the drive mechanism employed with the table leg shown in FIGS. 1 and 2.

A reversible electrically driven DC motor 30 is coaxially mounted within the upper end of cylindrical leg 18. Motor 30 can be a commercially available Pittman Model GM9236E347 motor, or its equivalent, and includes a drive shaft 34 (FIG. 3) extending downwardly from the motor. A disk-shaped motor mounting plate 40 (FIG. 3) includes a plurality of radially extending threaded apertures 42 for receiving flush mounted fastening screws 44 (FIG. 1) which secure plate 40 within the upper end of leg 18. Plate 40 includes axially extending threaded apertures 41 for receiving threaded fasteners 43 which secure the motor to the plate. The motor mounting plate 40 also includes a recess 46 (FIG. 3) for receiving a thrust bearing 45. A female coupling 52 at the end of threaded drive screw 50 receives motor shaft 34, and a conventional set screw (not shown) is radially threaded through coupling 52 and engages a flat 35 in shaft 34.

The shaft 34 of motor 30 extends coaxially within leg 18 in alignment with the externally threaded drive screw 50 which also extends coaxially within leg 18 into a tubular drive nut riser 60 extending upwardly from the floor 14 of outer leg 12. Drive nut riser 60 secures an internally threaded drive nut 62, which is mounted to the top end 61 of drive nut riser 60 in a conventional manner, such as by roll pins or the like, to prevent internally threaded drive nut 62 from rotating with respect to its fixed mounting at end 61 of drive nut riser 60.

Inner leg 18 has a longitudinally extending groove 19 which slidably engages a flange 15 of a lubricious polymeric sleeve 13 fixedly mounted to leg 12 and extending between legs 12 and 18 at the top of leg 12 as best seen in FIGS. 1 and 2. Sleeve 13 thus provides guided support for leg 18 as it extends and retracts from leg 12.

An electrical conductor (not shown) is coupled to the motor 30 for providing operating power through a conventional control circuit for extending and retracting the leg assembly 10 between the positions shown in FIGS. 1 and 2. When actuated, motor shaft 34 rotates drive screw 50 causing the drive screw to extend and retract from the power nut 62 held at end 61 of riser 60 within outer tube 12, thereby causing the extension and retraction of the telescopic legs 12, 18 as the motor direction is reversed. The coaxial mounting of the motor 30 within inner leg 18 and the aligned coaxial mounting of riser 60 allows a compact clean appearing adjustable leg assembly which can be motor actuated for raising and lowering tables, although the invention may have applications in any environment in which one member is to be moved with respect to a second member.

In the preferred embodiment of the invention, the legs extended from a retracted position, shown in FIG. 2, have a height of about 45 cm to an extended position, shown in FIG. 1, with a height of about 79 cm at a speed of 50 mm per second and is capable of lifting a load of 75 kg with the motor of the preferred embodiment of the invention.

It will become apparent to those skilled in the art that various modifications to the preferred embodiment of the invention as described herein can be made without departing from the spirit or scope of the invention as defined by the appended claims.

The invention claimed is:

1. A motorized telescopic leg assembly comprising:

an outer tubular leg;

an inner tubular leg telescopically fitted within said outer leg; and a drive assembly mounted within said inner and outer tubes, said drive assembly including:

a base plate;

a drive nut riser tube extending from said base plate;

a drive nut mounted to an end of said riser tube remote from said base plate;

a drive screw threadably extending into said drive nut and extendable into said riser tube; and a motor fitted within said inner leg and having a shaft coupled to said drive screw for rotating said drive screw for extending and retracting the inner leg with respect to the outer leg.

2. The assembly as defined in claim 1 wherein said inner and outer legs are cylindrical.

3. The assembly as defined in claim 2 wherein said drive nut riser tube is cylindrical.

4. The assembly as defined in claim 1 and further including a motor mounting plate for securing one end of the motor within the inner leg.

5. The assembly as defined in claim 4 wherein said assembly includes a mounting plate coupled to said inner leg and said motor includes a mounting fastener for securing an opposite end of said motor to said mounting plate.

6. The assembly as defined in claim 5 wherein said inner and outer legs are cylindrical.

7. The assembly as defined in claim 6 wherein said motor mounting plate is circular and fits within the cylindrical inner leg.

8. The assembly as defined in claim 7 wherein said inner leg includes a longitudinally extending slot and further including a bushing fixedly mounted to said outer leg and including a flange extending into said slot.

9. A drive assembly for telescopic legs including an outer tubular leg and an inner tubular leg telescopically fitted within said outer leg, said drive assembly extending within said inner and outer legs and comprising:

a base plate;

a drive nut riser tube extending from said base plate;

a drive nut mounted to an end of said riser tube remote from said base plate;

a drive screw threadably extending into said drive nut and extendable into said riser tube; and a motor fitted within the inner leg and having a shaft coupled to said drive screw for rotating said drive screw for extending and retracting the inner leg with respect to the outer leg.

10. The assembly as defined in claim 9 wherein said inner and outer legs are cylindrical.

11. The assembly as defined in claim 10 wherein said drive nut riser tube is cylindrical.

12. The assembly as defined in claim 9 and further including a motor mounting plate for securing one end of the motor within the inner leg.

13. The assembly as defined in claim 12 wherein said assembly includes a mounting plate coupled to said inner leg.

14. The assembly as defined in claim 13 wherein said inner and outer legs are cylindrical.

15. The assembly as defined in claim 14 wherein said motor mounting plate is circular and fits within the cylindrical inner leg.

16. The assembly as defined in claim 15 wherein said inner leg includes a longitudinally extending slot and further including a bushing fixedly mounted to said outer leg and including a flange extending into said slot.

* * * * *